United States Patent [19]
Chastain et al.

[11] Patent Number: 5,650,852
[45] Date of Patent: Jul. 22, 1997

[54] TEMPERATURE-COMPENSATED LASER MEASURING METHOD AND APPARATUS

[75] Inventors: William P. Chastain, Olympia; Marc A. Garoutte, Auburn; Eric J. Rogers, Seattle, all of Wash.

[73] Assignee: The Boeing Company, Seattle, Wash.

[21] Appl. No.: 612,544

[22] Filed: Mar. 8, 1996

[51] Int. Cl.⁶ .................................................. G01B 11/02
[52] U.S. Cl. .................................................. 356/383; 33/702
[58] Field of Search .................................. 356/373, 383, 356/384, 399, 400, 401; 33/707, 813, 818, 819, 820, 827–829; 250/559.19, 559.26, 223 R

[56] References Cited

U.S. PATENT DOCUMENTS

| | | | |
|---|---|---|---|
| 3,698,817 | 10/1972 | Iimura et al. | 356/373 |
| 3,930,730 | 1/1976 | Laurens et al. | 356/357 |
| 4,922,307 | 5/1990 | Schaffer | 356/373 |
| 4,928,019 | 5/1990 | Tomikawa et al. | 356/400 |

FOREIGN PATENT DOCUMENTS

| | | | |
|---|---|---|---|
| 4113201 | 4/1992 | Japan | 356/383 |

*Primary Examiner*—Hoa Q. Pham
*Attorney, Agent, or Firm*—Christensen, O'Connor, Johnson & Kindness PLLC

[57] ABSTRACT

A temperature-compensated laser measuring method and apparatus for determining the dimensions of long parts is disclosed. Parts to be measured are positioned along a y-axis fence (19) against an x-axis fence (21). A gantry (15) is moved along a precision support rail (17) to the desired longitudinal (x-axis) position. Then a probe (23) is moved inwardly or outwardly to a desired y-axis position and lowered to a desired z-axis position. A Doppler laser measuring system that includes a Doppler laser head (25) and retroreflector (27) measures x-axis length. Y-axis and z-axis encoders (29, 31) determine y-axis and z-axis probe position with respect to the y-axis fence and the top (39) of the table (13). A temperature compensation unit (103) receives the laser measurement information and modifies the x-axis length measurement based on part temperature and the coefficient of expansion of the part. A display system (33) receives all of the position and measurement information and displays length, width, and height dimensions.

18 Claims, 4 Drawing Sheets

TEMPERATURE-COMPENSATED LASER MEASURING METHOD AND APPARATUS

FIELD OF THE INVENTION

This invention relates to methods and apparatus for measuring the length of long parts and, more particularly, methods and apparatus for accurately measuring the length of long parts that experience thermal expansion and contraction.

BACKGROUND OF THE INVENTION

While, as will be understood from the following description, the present invention was developed for efficiently and effectively measuring long aircraft metal parts in a way that compensates for the thermal expansion and contraction of such parts, this invention may also find utility in other environments.

Aircraft endure great stresses and forces during their expected operational life, which is relatively long-more than twenty (20) years. When inconsistently dimensioned parts are included in an aircraft assembly, the ability of the aircraft to adhere to its design criteria and resist the stresses and forces applied to the aircraft may not be achieved. In order to avoid the inclusion of inconsistently dimensioned parts in an aircraft assembly, prior to assembly parts are measured to determine if they are sufficiently accurate.

Many structurally important aircraft parts are long-over twenty-four inches (24"). Currently there are three common methods of measuring long metal (e.g., aluminum) aircraft parts—using a standard (25 ft.) hand-held tape measure; laying a full-scale drawing on a part and comparing the drawing dimensions with the part dimensions; and transporting the part to a Coordinate Measuring Machine (CMM) location. Each method has disadvantages for in-process (i.e., during manufacturing and assembly) measuring.

The use of a standard hand-held tape measure does not provide sufficiently accurate, repeatable measurements. Drawings overlaid on a part may move during a dimension check. Further, any deformity of the drawing medium will make it difficult, if not impossible, to make an accurate dimension check. CMMs are not suited for real-time in-process production measuring for several reasons—the measuring process is lengthy, up to eleven hours in some instances; CMMs require highly trained operators; and CMMs are expensive, which limits the number of CMMs that can be provided to a production facility. Further, none of the foregoing methods provide temperature compensation. In this regard, all metal parts are subject to thermal expansion and contraction. While the amount of thermal expansion of small parts (or the short dimensions of elongate parts) is small and can usually be ignored, the longitudinal thermal expansion of long metal parts can be significant and must be taken into consideration if precisely assembled aircraft structures are to be produced.

Prior attempts to solve some of the disadvantages of the methods described above have involved using an optical encoder in combination with rack sections linearly arrayed on and attached to a table top. While very accurate over relatively short distances, this approach becomes increasingly less accurate with length due to the difficulty of maintaining the rack sections in precise linear alignment. Further, this approach does not provide temperature compensation.

In the past, temperature-compensated part measurement has involved enclosing the entire measurement system (i.e., an entire CMM) in a temperature-controlled room or building. While this approach is effective, it is also expensive and time consuming since parts must remain in the temperature-controlled environment for several hours (sometimes twelve to fourteen hours) before testing so that they can stabilize to the ambient temperature of the environment. Thus, this method is ineffective for use as an in-process production measuring device. If parts are only periodically measured using a CMM in a temperature-controlled environment, several incorrectly sized parts may be produced before a negative feedback from the CMM occurs. More importantly, in aircraft assembly, an unchecked, out-of-tolerance part may reach an aircraft assembly point and cause a "line" stoppage, shutting down the assembly of the related section of the aircraft. More specifically, present-day production philosophy is just-in-time parts manufacturing. As a result, there are very few parts, and ideally only one part, available at the point of assembly. A part that does not fit can shut down assembly, not only of the aircraft being assembled but also aircraft further down the assembly line. As a result, construction time is wasted producing bad parts.

The present invention is directed to overcoming the foregoing and other disadvantages. More specifically, the present invention is directed to providing a method and apparatus suitable for in-process production measuring of long parts that exhibit thermal expansion without the use of highly trained operators and expensive temperature-controlled environments.

SUMMARY OF THE INVENTION

In accordance with this invention, a method and apparatus for measuring elongate parts that exhibit thermal expansion is provided. Apparatus formed in accordance with this invention includes a long table for receiving the elongate parts to be measured. Located atop the table is a part location mechanism for precisely positioning an elongate part. Mounted on the table so as to overlie the elongate part is a gantry moveable from one end of the table to the other end. The gantry supports a vertical probe that is laterally aligned with a laser retroreflector mounted on the gantry. The laser retroreflector coacts with a Doppler laser head mounted on the table in lateral alignment with the part location mechanism to create a laser displacement meter. The laser displacement meter measures the distance between the laser head and the retroreflector and, thus, the length of a part positioned between the part location mechanism and the probe. The laser displacement measurement is temperature compensated for the ambient temperature in which the laser measurement is made, based on the coefficient of expansion of the elongate part being measured. The method of this invention generally comprises: precisely positioning an elongate part; precisely positioning a Doppler laser head with respect to one end of the elongate part; precisely positioning a retroreflector with respect to the other end of the elongate part; using the Doppler laser head and the retroreflector to measure the distance between the Doppler laser head and the retroreflector; and compensating the distance measurement for temperature based on the coefficient of thermal expansion of the elongate part.

In accordance with other aspects of this invention, the gantry is slidably supported by a platform mounted on a bearing block that is mounted on a straight rail that runs the length of the table.

In accordance with further aspects of this invention, the measuring apparatus also measures distances along two axes lying orthogonal to the axis of laser measurement and orthogonal to one another.

In accordance with still other aspects of this invention, optical encoders positioned on the gantry are used to make the measurements along the two axes lying orthogonal to the axis of laser measurement and orthogonal to one another.

As will be readily appreciated from the foregoing summary, the invention provides a new and improved method and apparatus for accurately measuring elongate parts in a manner that compensates for thermal expansion and contraction along the longitudinal axis of the parts. Because the system does not require special training or housing in costly temperature-controlled buildings, the disadvantages due to such training and housing are avoided.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
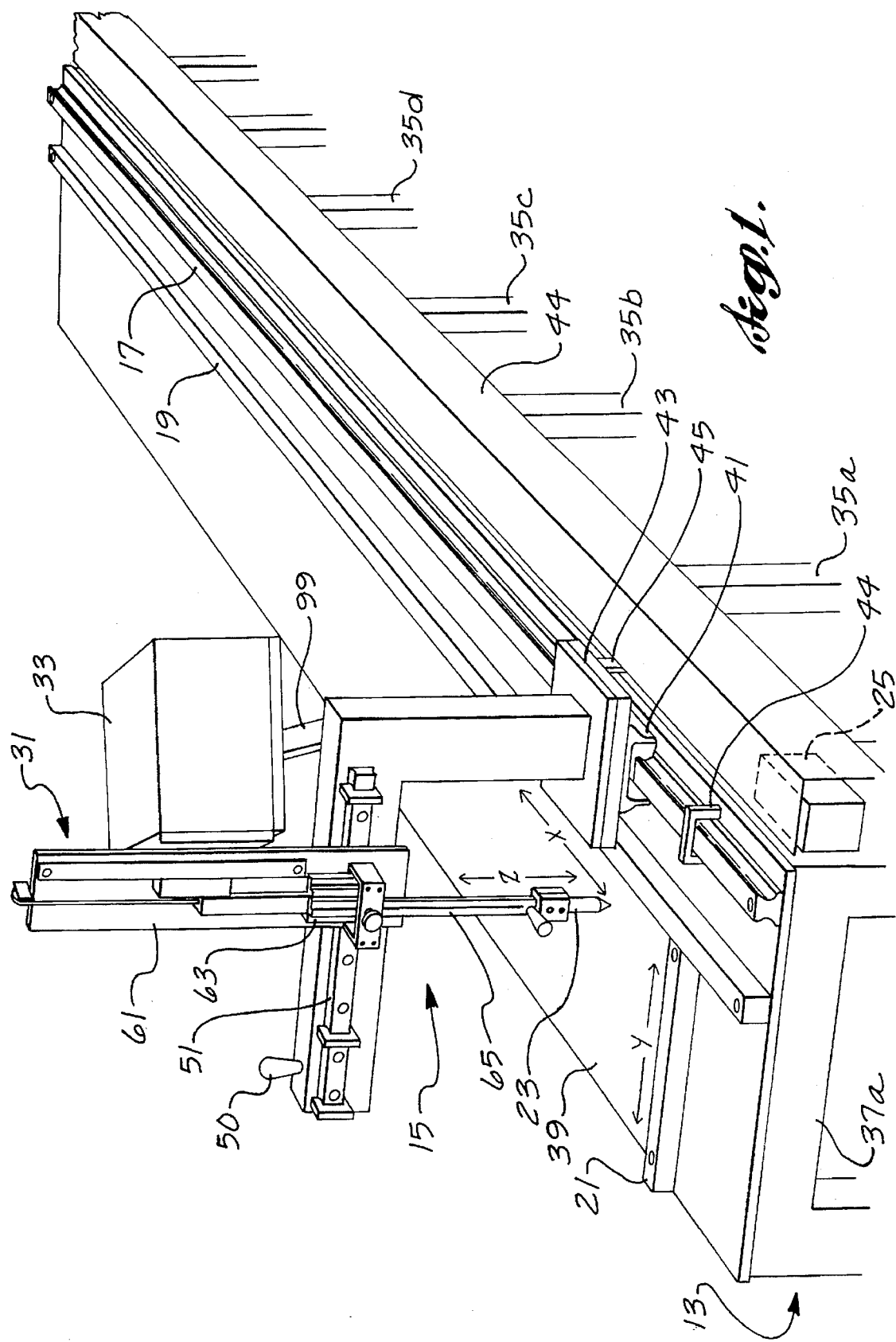
FIG. 1 is an isometric view of a temperature-compensated laser measuring apparatus formed in accordance with this invention.
Figure 2:
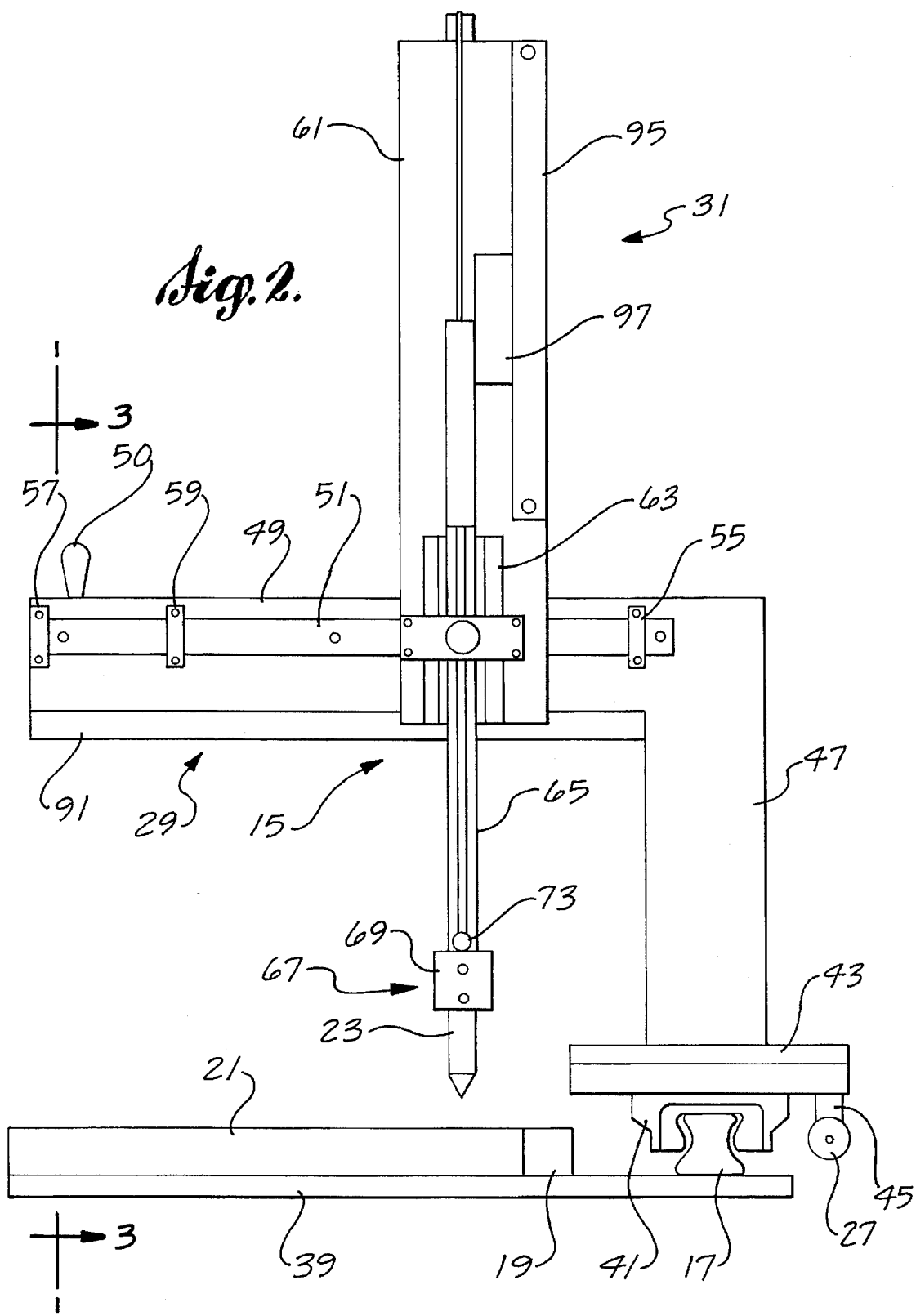
FIG. 2 is an end elevational view of a portion of the temperature-compensated laser measuring apparatus shown in FIG. 1.
Figure 3:
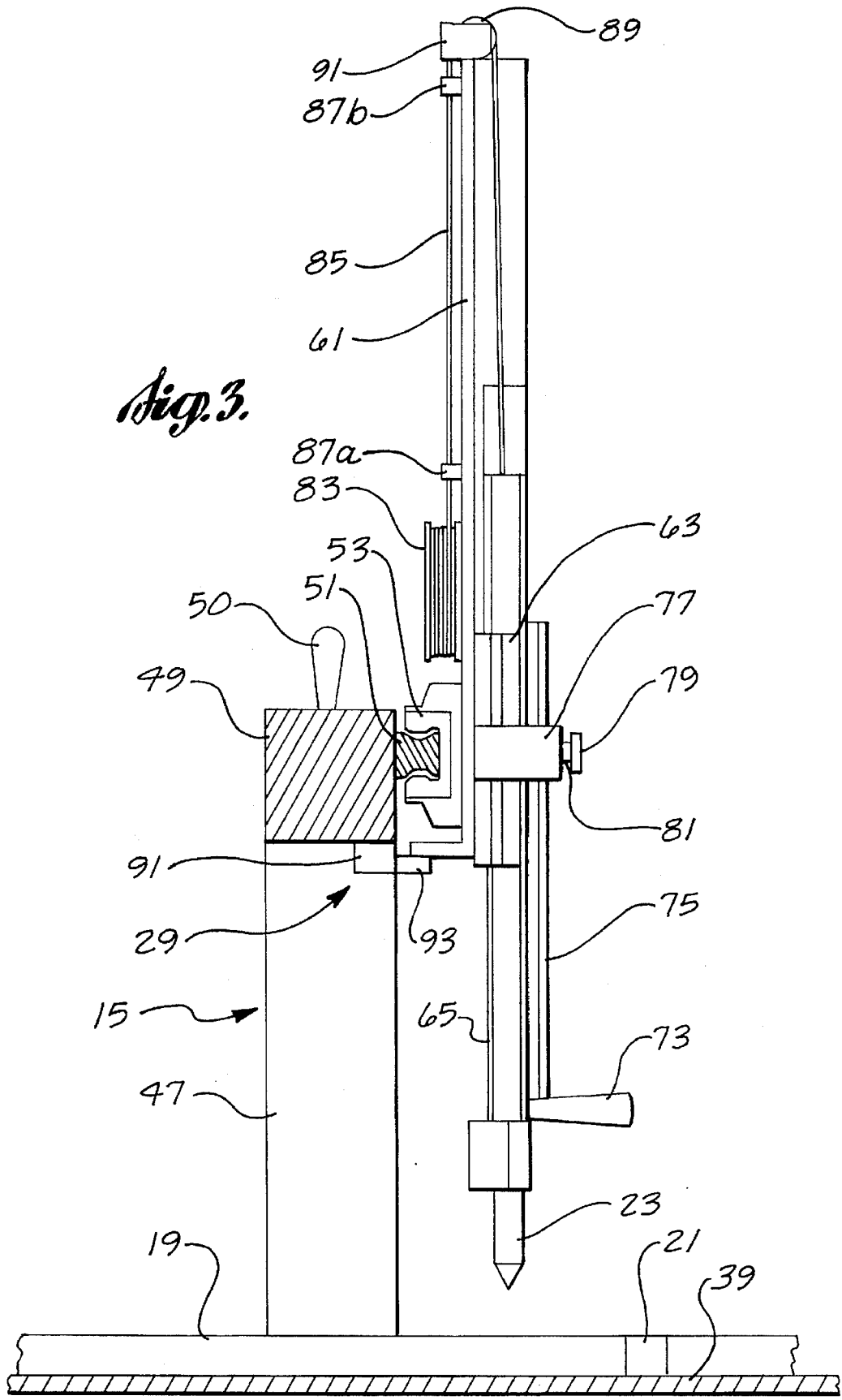
FIG. 3 is a side elevational view of a portion of the temperature-compensated laser measuring apparatus shown in FIG. 1.

FIGS. 1-3 illustrate the mechanical portion of a temperature-compensated laser measuring apparatus formed in accordance with the invention. More specifically, FIGS. 1-3 include: a long table 13; a gantry 15, an x-axis precision support rail 17; a part location mechanism comprising a y-axis fence 19 and an x-axis fence 21; a probe 23; a laser head 25; a retroreflector 27; a y-axis encoder 29; a z-axis encoder 31; and a display system 33. The long table 13 includes a rigid framework preferably formed of metal legs 35a, 35b, 35c . . . joined by end and side rails 37a, 37b, 37c . . . ; and a top 39. The top 39 extends the length of the table 13.

The x-axis precision support rail 17 is mounted lengthwise on the table top 39 along one edge thereof. The gantry 15 is slidably supported on the x-axis precision support rail 17 by an x-axis precision bearing assembly 41. As shown, the x-axis precision support rail has an I shape and the x-axis precision bearing assembly 41 has a corresponding I-shaped indentation. While various types of precision support rails and precision bearing assemblies can be used, in one actual embodiment of the invention, the chosen precision support rail/precision bearing assembly was the AccuGlide linear ball bearing system manufactured by the Thompson Saginaw Company, Inc., Port Washington, N.Y. The x-axis precision bearing assembly 41 supports a platform in the form of a base plate 43 that supports the gantry 15 in the manner described below.

The y-axis fence 19 is mounted on the top 39 of the table 13 parallel to, and inwardly of, the x-axis precision support rail 17. The x-axis fence 21 is also mounted on the top 39 of the table 13, near one end thereof. The x-axis fence 21 lies orthogonal to the y-axis fence 19. Preferably, a stop 44 is mounted on the x-axis precision support rail 17 in general alignment with the x-axis fence 21.

The laser head 25 is mounted on the side of the table 13 nearest to the x-axis precision support rail 17. The laser head 25 is located on the same end of the table as the x-axis fence 21, either in precise lateral alignment with the x-axis fence or at a precise lateral offset position with respect to the x-axis fence. The laser head is positioned so as to project a laser beam down the table 13 parallel to the y-axis fence 19 and the x-axis precision support rail 17.

The plate 43 mounted atop the x-axis precision bearing assembly 41 supports a downwardly extending arm 45. The arm extends below the top 39 of the table 13. Located at the bottom of the arm 45 is the retroreflector. The length of the arm and the orientation of the retroreflector 27 is such that the retroreflector intercepts the laser beam projected by the laser head 25 and reflects the beam back toward the laser head 25. External (human) observation of the laser beam is prevented by a U-shaped shield 44 supported by brackets (not shown) mounted on the table 13.

The gantry 15 has an inverted L-shaped configuration and is mounted atop the plate 43 supported by the x-axis precision bearing assembly 41 such that one leg 47 of the gantry 15 extends vertically upwardly and the other leg 49 extends horizontally outwardly so as to overlie the top 39 of the table 13. Mounted atop the outer end of the horizontal leg 49 of the gantry 15 is a handle 50. Mounted on the side of the horizontal leg 49 facing the x-axis fence 21 is a y-axis precision support rail 51. The y-axis precision support rail lies parallel to the x-axis fence 21. Mounted on the y-axis precision support rail 51 is a y-axis precision bearing assembly 53. Located at either end of the y-axis precision support rail 51 are stops 55 and 57. In addition, an intermediate stop 59 may be located inwardly from the outer end of the horizontal leg 49 of the gantry 15.

Mounted on the y-axis precision bearing assembly 53 is a vertical plate 61 that extends upwardly from the bearing assembly. Mounted on the outer face of the vertical plate 61, in general alignment with the y-axis precision bearing assembly 53, is a z-axis precision bearing assembly 63. The z-axis precision bearing assembly 63 is oriented orthogonal to the y-axis precision bearing assembly 53 and orthogonal to the x-axis precision support rail 17. Mounted on the z-axis precision bearing assembly 63 is a z-axis precision support rail 65. Thus, the z-axis precision support rail 65 is vertically oriented.

As shown, preferably, the y-axis and z-axis precision support rails have a generally I-shaped cross-sectional configuration and the y-axis and z-axis precision bearing assemblies have a correspondingly shaped aperture. While various types of precision support rails and precision bearing assemblies can be used, in one actual embodiment of the invention, the chosen precision support rail/precision bearing assemblies are the AccuGlide linear ball bearing system manufactured by the Thompson Saginaw Company, Inc., Port Washington, N.Y.

Attached to the lower end of the z-axis precision support rail 65 is a probe assembly 67 comprising an attachment bracket 69 for receiving the probe 23. The probe 23 is interchangeable. The lower end or tip of the probe 23 may take on various shapes—an inverted cone, as shown, or flat, for example. The shape will be determined by the function to be performed, such as fitting into a drilled hole or lying atop a workpiece. In essence, there are three basic functions that can be carried out by the probe. A cone-shaped probe can be used to determine the center of a small hole—a hole an inch or less in diameter. A side of a cylindrical probe can be used to determine the location of an edge or the size of a large hole. The bottom of a cylindrical probe can be used to locate a horizontal surface.

Preferably a handle 73 is affixed to the z-axis precision support rail 65, above the probe assembly attachment bracket 69. Located on the side of the z-axis precision support rail 65 facing the x-axis fence 21 is an elongate plate 75. Surrounding the z-axis precision bearing assembly 63 and the portion of the z-axis precision support rail 65 and the elongate plate 75 aligned with the Z-axis precision bearing assembly 63 is a U-shaped bracket 77. The cross-leg of the U-shaped bracket supports a lock knob 79 mounted on a screw 81 whose inner end is aligned with the elongate plate 75. Rotating the lock knob 79 so that the screw 81 moves inwardly creates a compression pressure that presses the z-axis precision support rail 65 against the z-axis precision bearing assembly 63, locking the z-axis precision support rail in a fixed vertical position.

Mounted on the side of the vertical plate 61 remote from the side supporting the z-axis precision bearing assembly 63 is a spring-loaded cable counterbalance mechanism 83. The cable 85 of the cable counterbalance mechanism 83 passes through one or more guides 87a, 87b mounted on the vertical plate 61 and over a pulley 89 mounted in a bracket 91 positioned atop the vertical plate 61. The distal end of the cable 85 is attached to the top of the z-axis precision support rail 65. The counterbalance mechanism allows the z-axis precision support rail 65 and, thus, the probe 71 to remain in any manually set up or down position regardless of whether the lock knob 79 is rotated into a lock position.

The z-axis encoder 29 is, preferably, an optical encoder that includes an encoder scale 91 mounted on the bottom of the horizontal arm 49 of the gantry 15 in parallel alignment with the y-axis precision support rail 51. Attached to the bottom of the vertical plate 61, in lateral alignment with the encoder scale 91, is a reading head 93. As a result, as the y-axis precision bearing assembly 53 is moved back and forth along the y-axis precision support rail 51, the output of the y-axis encoder 29 changes. Since the movement of the probe 23 along the y-axis follows the movement of the y-axis precision bearing assembly, the y-axis encoder output defines the y-axis position of the probe 23.

The z-axis encoder 31 is also, preferably, an optical encoder. The z-axis encoder is located on the vertical plate 61, adjacent to the upper end of the z-axis precision support rail 65. More specifically, the z-axis encoder includes an encoder scale 95 mounted on the vertical plate in parallel alignment with the z-axis precision support rail 65. Attached to the upper end of the z-axis precision support rail 65 is a reading head 97. As a result, as the z-axis precision support rail is moved up and down, the output of the z-axis encoder changes. Since movement of the probe 23 follows movement of the z-axis precision support rail 65, the z-axis encoder output defines the z-axis position of the tip of the probe 23.

Various types of optical encoders can be used to form the y-axis and z-axis encoders 29 and 31. In one actual embodiment of the invention, the chosen y-axis and z-axis encoders are Mini-Scale and Mate System Encoders manufactured by Acu-Rite Incorporated, Jamestown, N.Y.

As shown in FIG. 1, the display system 33 is mounted on a bracket 99 affixed to the side of the gantry 15 remote from the side supporting the vertical plate 61. For ease and clarity of illustration, the display system 33 is not shown in FIGS. 2 and 3. Likewise, for clarity and ease of illustration, the signal and power cables for the laser head 25 and the y-axis and z-axis encoders 29 and 31 are now shown in FIGS. 1–3. Preferably, the laser head 25 is the head of a Doppler laser. A Doppler laser is preferred because some lasers, such as interferometer lasers, are more subject to linear displacement errors than are Doppler lasers, resulting in unacceptable alignment time. A Doppler laser is easier to align because it has only one optical element to target, i.e., align. An interferometer laser has two optical elements to target. A Doppler laser requires much less precision of alignment of all parts on the table. Other types of laser systems, such as interferometer lasers, would require that the laser and retroreflector be mounted on a solid base, such as a twenty-four inch (24") thick slab of granite. Further, interferometer lasers do not respond quickly enough to make rapid measurements. While various types of Doppler lasers can be used, in one actual embodiment of the invention the chosen laser is the Laser Doppler Displacement Meter manufactured by Optodyne, Inc., Compton, Calif.

Figure 4:
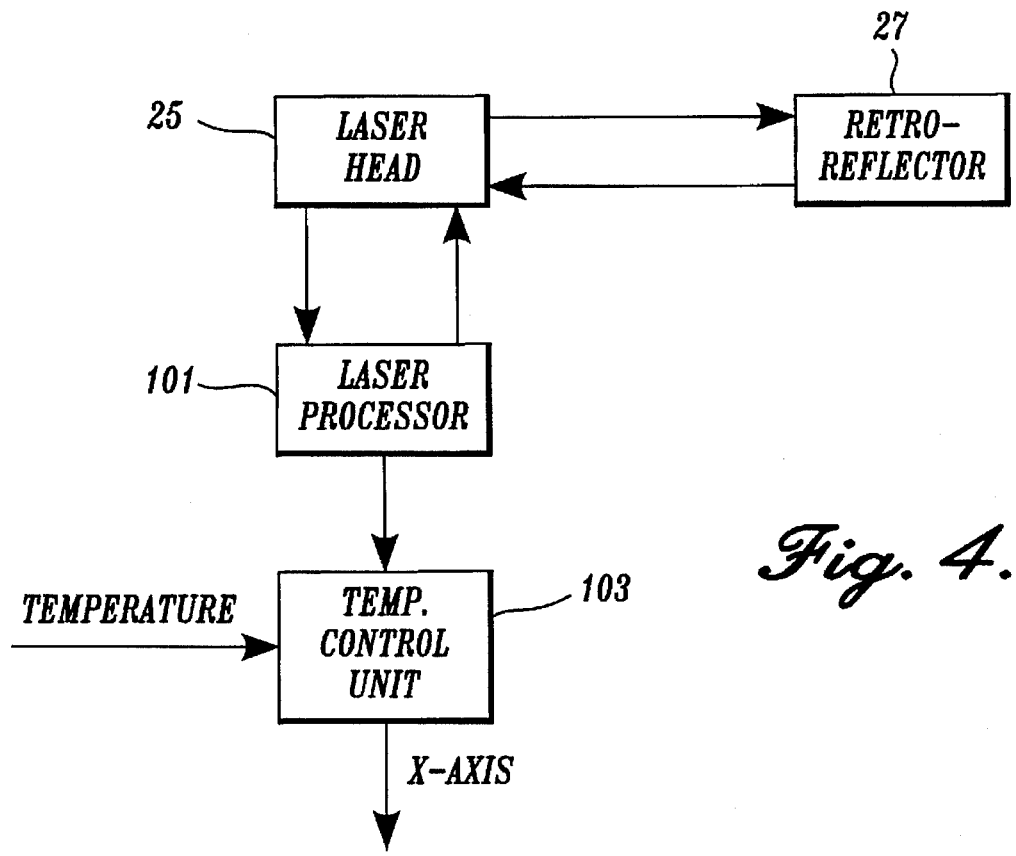
FIG. 4 is a block diagram of the laser portion of the temperature-compensated laser measuring apparatus shown in FIG. 1.

As illustrated in FIG. 4, in addition to the laser head 25 and the retroreflector 27, a Doppler laser includes a laser processor 101. In a conventional manner, the laser processor causes the laser head 25 to emit a laser pulse that is received by the retroreflector 27, which reflects the laser pulse back to the laser head 25. The laser processor measures the time between transmission and reception and outputs the time measurement as a distance measurement.

In accordance with this invention, the distance output of the laser processor 101 is applied to a temperature compensation unit (TCU) 103 that can either pass the laser processor output unmodified or temperature compensate the laser processor output based on the coefficient of expansion of a part being measured. More specifically, the TCU 103 has two modes of operation controlled by a switch (not shown). In the first mode, the TCU 103 sends the laser measured distance directly to the display system shown in FIG. 5 and described below. The first mode is a non-temperature compensated mode. The second mode of operation is a temperature-compensated mode that takes into consideration the temperature and the coefficient of expansion of the part being measured. In this regard, a predetermined temperature is programmed into the TCU 103. The temperature of the part is determined by a suitable temperature-measuring instrument, such as a thermocouple mounted on the top 39 of the table. The TCU uses the following formula:

$$L_p = L_1/[1+(\gamma)(T-P)] \qquad (1)$$

where $L_p$=Length of the part at P degrees $L_1$=Length of part measured at T degrees $\gamma$=Part's thermal coefficient of expansion T=Temperature of part P=Predetermined temperature to determine the length that would have been measured if the temperature of the part had been at P when the measurement was made.

Figure 5:
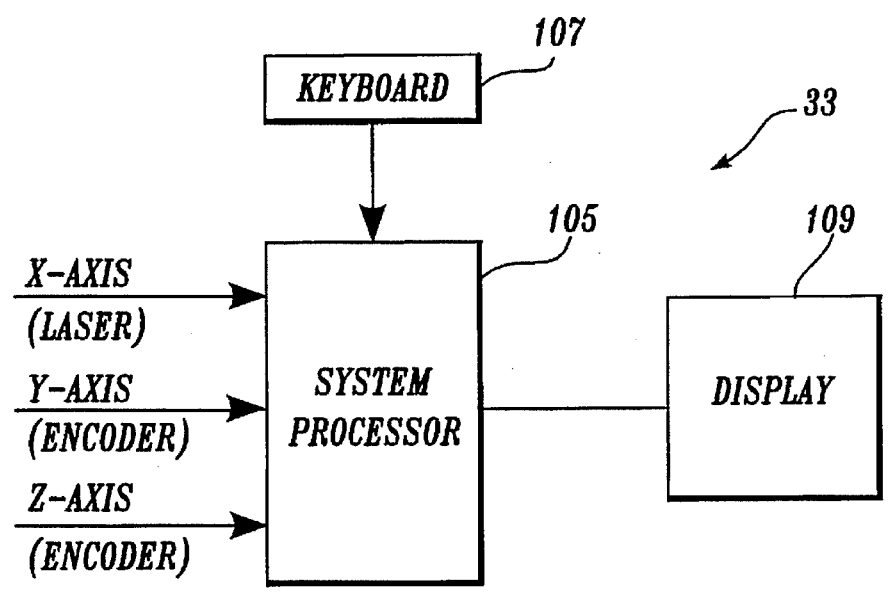
FIG. 5 is a block diagram of the control system of the temperature-compensated laser measuring apparatus shown in FIG. 1.

FIG. 5 is a block diagram illustrating the major elements of the display system 33. The illustrated elements include a system processor 105, a keyboard 107, and a display 109. The system processor receives the laser distance signal from the temperature compensation unit 103 produced in the manner described above. The laser processor 105 also receives position signals from the y-axis encoder 29 and the z-axis encoder 31. The keyboard 107 allows an operator to enter any desired information, such as a part identification number. The keyboard 107 can also be used to program the system processor 105. The system processor interprets the x-axis, y-axis, and z-axis signals and produces length, width, and height data on the display 109.

Turning now to a detailed description of the operation of the temperature-compensated laser measuring method and apparatus illustrated in FIGS. 1–5, an elongate part (not shown) is laid on the top 39 of the table 13 such that one of the longitudinal edges of the part is juxtaposed against the y-axis fence 19 and one end of the part is juxtaposed against the x-axis fence 21. Thereafter, the gantry 15 is moved along the x-axis precision positioning rail 17 until the probe 23 is located above the x-axis position to be measured. If the overall length of the part is to be measured, the gantry 15 is moved to the other end of the part, i.e., the end of the remote from the x-axis fence 21, using the handle 50. If an intermediate position is to be measured, such as the location of a hole in the part, the gantry 15 is moved to the related x-axis position. Thereafter, the probe is moved inwardly or outwardly in the y-axis direction by pulling the vertical plate 61 back and forth, as required. Then the probe is lowered by lowering the z-axis precision rail 65 until the tip of the probe 23 is in the appropriate position. Thereafter, the laser is enabled to make a longitudinal measurement with or without temperature compensation and the outputs of the y-axis and z-axis encoders 29 and 31 are read. The resulting measurement information is displayed on the display 109.

As will be readily appreciated by those skilled in the art and others, the invention has a number of advantages. The temperature compensation feature allows the length of a part to be measured regardless of ambient temperature. The use of an L-shaped gantry, as opposed to a large U-shaped gantry, results in a relatively lightweight measuring instrument. While the system is manually operated, it is relatively easy to position the probe at any desired position along the length of the part to be measured. As a result, in addition to width (y-axis) and height (z-axis) measurements, a plurality of longitudinal position measurements, e.g., hole measurements, can be made as well as overall length measurements. All of the longitudinal, i.e., x-axis, measurements can be temperature compensated if desired. The use of precise positioning rails and precise bearing assemblies results in an extremely precise measuring instrument. Because a Doppler laser is utilized, the gantry can be quickly moved to any desired position without loss of measurement capability.

While the presently preferred embodiment of the invention has been illustrated and described, it is to be understood that within the scope of the appended claims various changes can be made therein without departing from the spirit and scope of the invention.

The embodiments of the invention in which an exclusive property or privilege is claimed are defined as follows:

1. Apparatus for providing temperature-compensated length measurements of elongate parts that exhibit thermal expansion comprising:

a long table having a top for receiving elongate parts to be measured;

a part location mechanism for precisely positioning an elongate part located on the top of said table;

a gantry mounted on said table for movement along the length of said table;

a vertically oriented probe mounted on said gantry so as to overlie a part precisely positioned in said part location mechanism;

a retroreflector mounted on said gantry so as to move along the length of said table with said gantry, said retroreflector precisely positioned with respect to the position of said probe;

a Doppler laser, including a Doppler laser head mounted in a precise position on said table so as to project a laser beam along said table toward said retroreflector, for measuring the distance between said Doppler laser head and said retroreflector; and a temperature compensation unit connected to said Doppler laser for temperature compensating the measurement of the distance between said Doppler laser head and said retroreflector based on the temperature at which said measurement is made and the coefficient of expansion of an elongate part being measured.

2. Apparatus as claimed in claim 1, wherein said part location mechanism includes a y-axis fence that extends along the length of said top of said table and an x-axis fence orthogonally positioned with respect to said y-axis fence.

3. Apparatus as claimed in claim 2, including an x-axis precision support rail mounted on said top of said table so as to lie parallel to said y-axis fence, said gantry mounted on said x-axis precision support rail for movement along the length of said table.

4. Apparatus as claimed in claim 3, including a y-axis positioning mechanism mounted on said gantry for positioning said probe in a direction parallel to said x-axis fence.

5. Apparatus as claimed in claim 4, including a y-axis encoder associated with said y-axis positioning mechanism for determining the position of said y-axis positioning mechanism and, thus, said probe in a direction parallel to said x-axis fence.

6. Apparatus as claimed in claim 5, including a z-axis positioning mechanism mounted in said y-axis positioning mechanism for positioning said probe orthogonal to the top of said table and, thus, orthogonal to said x-axis fence and said y-axis fence.

7. Apparatus as claimed in claim 6, including a z-axis encoder associated with said z-axis positioning mechanism for determining the position of said z-axis positioning mechanism and, thus, said probe in a direction orthogonal to the top of said table.

8. Apparatus as claimed in claim 4, including a z-axis positioning mechanism mounted in said y-axis positioning mechanism for positioning said probe orthogonal to the top of said table and, thus, orthogonal to said x-axis fence and said y-axis fence.

9. Apparatus as claimed in claim 1, including an x-axis precision support rail mounted on said top of said table so as to extend along the length of said table, said gantry mounted on said x-axis precision support rail for movement along the length of said table.

10. Apparatus as claimed in claim 9, including a y-axis positioning mechanism mounted on said gantry for positioning said probe in a direction orthogonal to said x-axis precision support rail and orthogonal to the top of said table.

11. Apparatus as claimed in claim 10, including a y-axis encoder associated with said y-axis positioning mechanism for determining the position of said y-axis positioning mechanism and, thus, said probe in a direction orthogonal to said x-axis precision support rail and orthogonal to the top of said table.

12. Apparatus as claimed in claim 11, including a z-axis positioning mechanism mounted on said y-axis positioning mechanism for positioning said probe orthogonal to the top of said table.

13. Apparatus as claimed in claim 12, including a z-axis encoder associated with said z-axis positioning mechanism for determining the position of said z-axis positioning mechanism and, thus, said probe in a direction orthogonal to the top of said table.

14. Apparatus as claimed in claim 10, including a z-axis positioning mechanism mounted on said y-axis positioning mechanism for positioning said probe orthogonal to the top of said table.

15. A method for providing temperature-compensated length measurements of elongate parts that exhibit thermal expansion comprising:

precisely positioning an elongate part;

precisely positioning a Doppler laser head with respect to one end of the elongate part;

precisely positioning a retroreflector with respect to a position along the length of said elongate part;

using the Doppler laser head and the retroreflector to measure the distance between the Doppler laser head and the retroreflector and, thus, the distance between said one end of said elongate part and said position along the length said of said elongate part; and temperature compensating said distance measurement for temperature based on the coefficient of thermal expansion of the elongate part and the ambient temperature at which the distance measurement is made.

16. The method claimed in claim 15 also comprising measuring the width of said elongate part.

17. The method claimed in claim 16 also comprising measuring the thickness of said elongate part.

18. The method claimed in claim 15 also comprising measuring the thickness of said elongate part.

* * * * *